United States Patent [19]

McDowall et al.

[11] Patent Number: 5,528,262
[45] Date of Patent: Jun. 18, 1996

[54] METHOD FOR LINE FIELD-SEQUENTIAL COLOR VIDEO DISPLAY

[75] Inventors: Ian E. McDowall, Menlo Park; Mark T. Bolas, Palo Alto, both of Calif.

[73] Assignee: Fakespace, Inc., Menlo Park, Calif.

[21] Appl. No.: 333,621

[22] Filed: Nov. 2, 1994

Related U.S. Application Data

[63] Continuation of Ser. No. 7,157, Jan. 21, 1993, abandoned.

[51] Int. Cl.$^6$ ..................................................... G09G 5/04
[52] U.S. Cl. ............................................. 345/151; 345/88
[58] Field of Search ................................ 345/88, 150, 87, 345/151, 94, 148; 348/266–270

[56] References Cited

U.S. PATENT DOCUMENTS

| | | |
|---|---|---|
| 3,783,184 | 1/1974 | Ernstoff et al. . |
| 4,090,219 | 5/1978 | Ernstoff et al. . |
| 4,582,396 | 4/1986 | Bos et al. . |
| 4,611,889 | 9/1986 | Buzak . |
| 4,635,051 | 1/1987 | Bos . |
| 4,758,818 | 7/1988 | Vanté. |
| 4,758,884 | 7/1988 | Roy . |
| 4,816,816 | 3/1989 | Usui ............................................ 345/94 |
| 4,827,255 | 5/1989 | Ishii ........................................... 345/148 |
| 4,843,381 | 6/1989 | Baron ........................................ 345/151 |
| 4,991,941 | 2/1991 | Kalmanash . |
| 5,077,553 | 12/1991 | Buzak ......................................... 345/87 |

OTHER PUBLICATIONS

Hallett, Joe, "Monochrome to Color", Byte, pp. 179–182, Jul. 1992.
Keller, Peter "The CRT: Technology History & Applications" Jan., 1991.
Tannas, Jr. "Flat Panel Displays" Jan., 1985.
Peterson, Ivars "Looking Glass Worlds" Jan., 1992.
Mallet, Joe "Monocrome to color" Jul., 1992.

Primary Examiner—Curtis Kuntz
Assistant Examiner—Vivian Chang
Attorney, Agent, or Firm—Limbach & Limbach; Alfred A. Equitz

[57] ABSTRACT

Describes the application of field-sequential color techniques to create a line field-sequential color display with particular advantages for head-mounted and head-coupled displays. The display is composed of a gray-scale CRT or other white display and a color shutter with fast switching time. The shutter is switched during blanking to create a color display in a sequential color fashion where the color fields are not entire frames.

12 Claims, 4 Drawing Sheets

METHOD FOR LINE FIELD-SEQUENTIAL COLOR VIDEO DISPLAY

This is a continuation of application Ser. No. 08/007,157 filed on Jan. 21, 1993, now abandoned.

BACKGROUND: FIELD OF THE INVENTION

The method of this invention relates to the construction of a color video display from an inherently white display. The white display is coupled with a color shutter apparatus which changes color. The color-changing apparatus filters light from the white display to produce a display in which one color component of the image is drawn first, then a second color component is drawn. This happens multiple times. The method of this invention can be used to superimpose three images each consisting of red, green, and blue components. By producing these images at a rate higher than the flicker fusion frequency, the viewer perceives a single, full-color image.

DESCRIPTION OF PRIOR ART

Field-sequential color video techniques have existed since the early days of television. Several approaches are currently used to produce color sequential displays.

One existing approach is based on the use of beam-penetration tubes which have a phosphor coating on the inside of a single-gun, cathode ray tube (CRT). The phosphor is structured to emit different wavelengths of light depending on the beam energy. The beam energy determines the depth of penetration into the layered phosphor and the resulting dominant color. Therefore, to create a color image, the screen is scanned twice at differing beam energies. This technique has yielded avionics displays that use onionskin phosphors and generate three or four shades between red and green. While these displays provide outstanding resolution, the high voltage (which determines the beam energy) must be changed during vertical retrace where there is sufficient time to adjust it [Tannas, 147; Keller, p 81; U.S. Pat. No. 2,590,018 1950 L. R. Koller].

Another existing approach employs mechanical color filters in the form of rotating disks, oscillating strips, and color loops. The mechanical device is synchronized with the display's vertical retrace. The image's color fields are drawn in succession and the mechanism is synchronized to the vertical blanking of the display. As a result, the viewer sees a rapid succession of single-color images which are merged by the eye over time to create a multicolor image. Among the earliest of these systems is the color system developed by Columbia Broadcasting System in 1940 [Keller 208 and 169]. This idea has been employed recently by Hitachi and Matshushita, applying the same technique for a color viewfinder in a video camera.

More recently, color filters that can be electronically controlled have been produced by companies such as Kaiser Electronics, Optical Shields and Tektronics. Electro-optical color shutters are situated in front of a monochrome CRT, where they change color. To date, these have been commercially available only in a form that provides two primary colors; the filters could be switched from red to green on a per-field basis (the image was drawn in two passes, a red pass and a green pass).

Three-color shutters are now available. However, a problem is presented by the fact that they separate the image into three, single-component color fields. This means the displays are not plug-compatible with existing video formats which present the color components of the image simultaneously. In addition, the display must scan faster than a regular color display such that the video bandwidth and scan rates are tripled. To date, these displays have employed shutters based on liquid crystal technology which is relatively slow (switching times in the milliseconds range). [Keller, 208; Tektronics article in SID]. Other existing techniques (using ferromagnetic materials, for example) yield color shutters with very short switching times (microseconds). The patents relating to these devices include: U.S. Pat. No. 4,991,941 two-color shutter; U.S. Pat. Nos. 4,758,818, 4,635,051, 4,611,889, 4,582,396 liquid crystal shutters for full color field sequential displays; U.S. Pat. No. 4,090,219 LCD display and color sequential back light; and U.S. Pat. No. 3,783,184 ferro-electric color shutter based field sequential display.

All these systems describe full-frame, field-sequential displays: In these systems, the display draws an entire picture as three successive color images. First, the entire image is rendered using its red component. After a vertical blanking, the beam returns to the top of the display while the color filter changes to green. Then the frame is redrawn, using the image's green component. The filter then changes to blue, and the frame is drawn a third time. Because the approach taken is a full-frame field sequential method, the display just runs at three times the rate of a regular display and the filter color and the component of the image are coordinated. Some shutters change colors in sections to allow more time for the shutter material to change color, particularly when using the older, slower types of liquid crystal materials. The ferro-electric and ferro-magnetic types of shutter do not have this additional complexity, as they switch much faster.

Field-sequential displays are of great interest in situations that require small (less than 10 inch diagonal) color displays. Small color displays are required in avionics, particularly in the area of head-mounted and head-coupled displays. Such displays must provide extremely high spatial resolution, unlike existing shadow-mask techniques. The displays for "virtual reality" applications involving computer-generated, immersive environments must provide extremely high resolution (both chromatic and spatial) and must be physically small enough fit into a head-mounted or head-coupled apparatus.

The method of this invention solves the following problems presented by the previously described field-sequential techniques:

(a) Such displays are sequential on a frame-by-frame basis. In order to interface between such a display and the normal RS-343 video standard which produces the image's color components simultaneously, an entire frame of video must be stored. This stored frame is scanned out to the display at three times the normal rate. Thus, the interface between standard color video and the previous described field-sequential displays require a full frame of video storage, which introduces a time delay and increases the cost of the converter. The time delay introduced by the flame storage is undesirable in interactive virtual reality and other simulation type applications.

(b) In virtual reality applications that employ head-mounted or head-coupled displays, it has been shown that the use of flame-field sequential system results in the viewer perceiving a disturbing color afterimage after moving his or her head. This afterimage causes colored objects that consist of two or more primary colors to break up into "colored shadows" as the viewer's head moves. FIG. 3a shows a sequence of images as the viewer would like them to be perceived. If the circle of FIG. 3 consists of a mix of a set of colored sub flames, then the viewer perceives the image shown in FIG. 3b.

(c) In beam penetration systems, the range of available colors is very limited. In general only two phosphors may be used and so the resulting image will not be full color. These displays also require the modulation of voltages in the 5 kV to 20 kV range which is challenging.

(d) Mechanical shutters are of limited application because of the moving parts required to build them.

Instead of employing a full-flame, field-sequential display technique, the method of this invention employs a line field-sequential technique. It differs in that instead of drawing an entire frame of the image as a number of colored fields, each individual scan line in the display is color modulated over time. For example the top line in the display is drawn three times. The first time the red color information for the line is drawn. At the end of the scan line the CRT beam is turned off and while it is being returned to the left hand side of the display (horizontal blanking), the shutter changes from red to green. The same scan line is then drawn by the CRT with the green information from the scan line modulating the intensity of the beam. At the edge of the display, the beam is again blanked and retraced to the left of the display. Meanwhile the shutter changes from green to blue. The blue component of the scan line is then used to modulate the intensity of the white CRT. The process of scanning each scan line three times and the shutter changing color for each line continues as the beam progresses down the display. By the bottom of the display, a full color image has been drawn from the observer's point of view. In addition to merely doing a single scan line in this way, a small group of scan lines could be scanned.

OBJECTIVES & ADVANTAGES

The line field-sequential display described in the method of this invention results in the following objectives and advantages:

(a) A color display that is better-suited to immersive and wide-field applications such as virtual reality and telepresence; the perceived color of a displayed object does not leave color afterimages when the viewer moves his or her head or causes the object to quickly move;

(b) A color display that is easy to interface with international video format standards in which the color information is not serialized;

(c) A color display that can be configured to perform spatial anti-aliasing of color in the display itself to improve the perceived image quality.

DRAWING FIGURES

In the drawings, closely related figures are identified by one number and different alphabetic suffixes.

Figure 1:
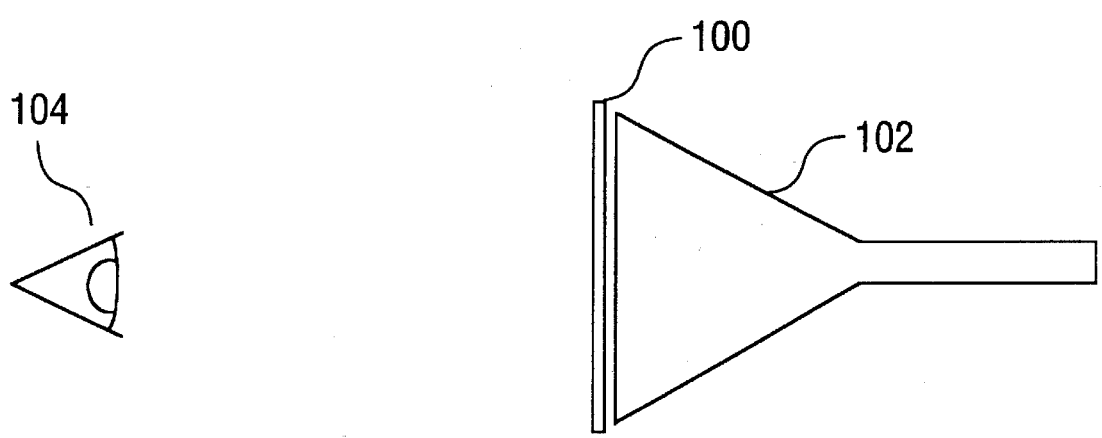
FIG. 1 illustrates the basic display and color-changing filter configuration.

Reference Numerals In Drawings 100 Color shutter

102 Display (CRT or other monochrome display)
104 Viewer
200 Display surface as perceived
  201 Area enlarged as 202
  202 Enlargement of 201
  204 Color shutter turns red
  206 Color shutter turns green
  208 Color shutter turns blue
  210 Color shutter turns red
  212 Color shutter turns green
  214 Color shutter turns blue
  216 Scan line 1 red field
  218 Scan line 1 green field
250 Enlargement of 252
  252 Area enlarged as 250
  254 Display as perceived
  256 Shutter turns red
  258 Red components drawn
  260 Shutter turns green
  262 Green components drawn
  264 Shutter turns blue
  266 Blue components drawn
  268 Shutter turns red
  270 Red components drawn
  272 Shutter turns green
  274 Green components drawn
  276 Shutter turns blue
  278 Blue components drawn

DESCRIPTION

FIG. 1

FIG. 1 illustrates a typical embodiment of the line field-sequential display of the method. FIG. 1 shows a side view of the display 102 which is a gray-scale CRT, or another white display. There is a color-changing material 100 in front of the display and the viewer 104. The color-changing material could be a ferroelectric-based shutter [as described in U.S. Pat. No. 4,090,219] or a liquid crystal color shutter [as described in U.S. Pat. No. 4,758,818]. Between the shutter and the viewer, there could be optics for making the perceived image cover a wider field of view. The color shutter must be situated between the viewer and the display, but not necessarily directly in front of the display. For example, it could be between the optical elements of a relay lens assembly. Element 100 operates so that any particular place on the surface of display 102 (when display 102 is a gray-scale CRT and is viewed through element 100) emits light which averages out over time to white light in a gray scale range rather than light of a specific color.

DESCRIPTION OF OPERATION

FIGS. 1 through 4

As previously mentioned, the method of this invention divides the display into portions that are smaller than an entire frame and uses the sequential color approach on one section of the display at a time.

FIG. 1 illustrates the placement of the shutter 100, the monochrome display 102, and the viewer 104. The shutter and phosphor or electro-luminescent material are of the type that can produce three primary colors from which "white" is perceived. This description assumes the three primaries are red, green, and blue, although it will be apparent to those skilled in the art that any three primaries will produce the same effect.

Figure 2A:
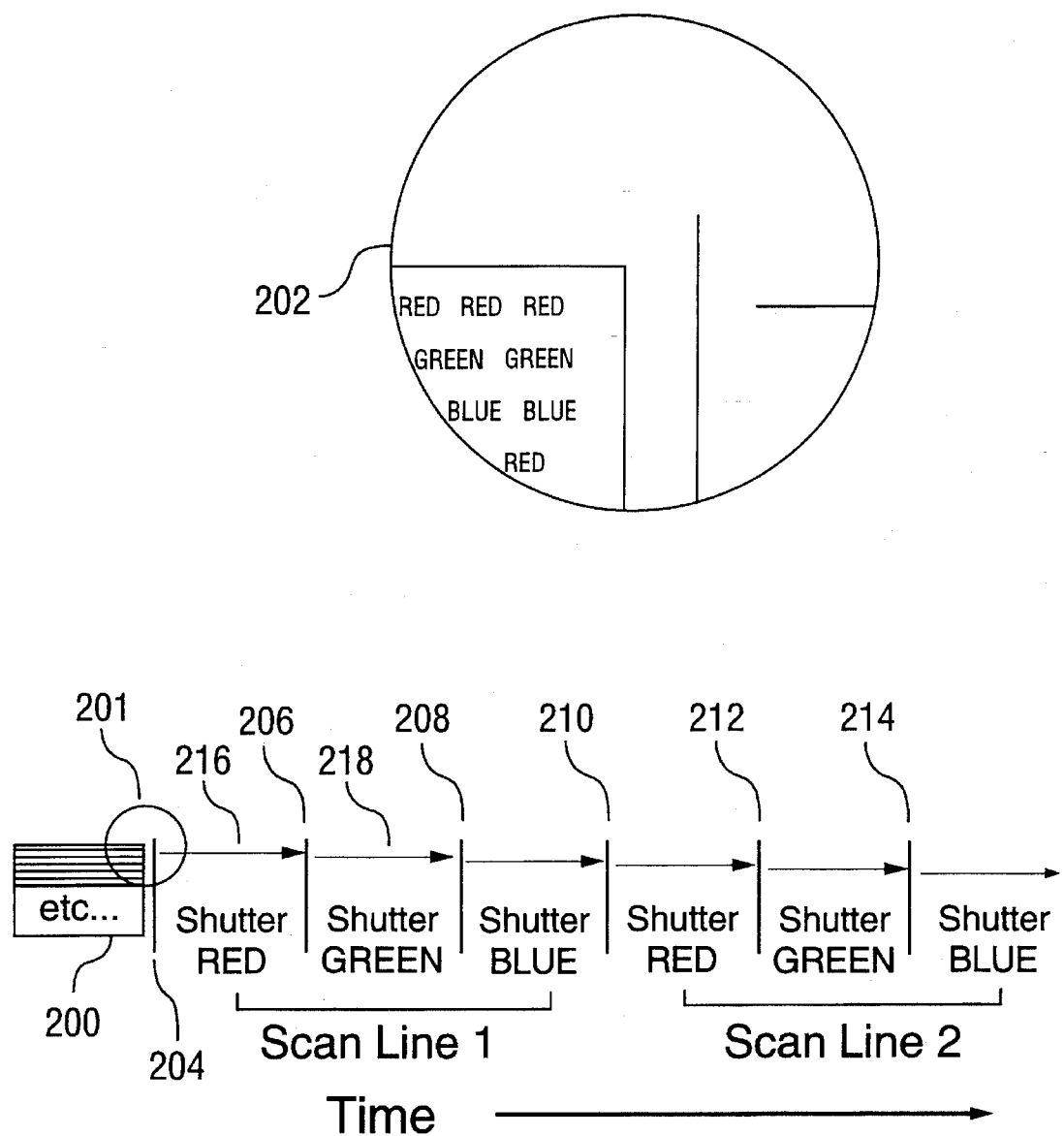
FIG. 2a illustrates an example of the scanning of a color image by a line-field sequential display in which the consecutive lines are of different colors.

FIG. 2a illustrates the operation of an embodiment of the line field-sequential color display. It shows the display surface 200 after a number of scans have taken place. The viewer will perceive an image composed of multiple scan lines, shown in the enlargement 202. Time is progressing to the right and the arrows indicating shutter action 216, 218 illustrate the scanning path of the display. In the actual display, these scan lines would be one above the other, separated in time, as illustrated. Between the scans, the vertical lines 204,206,208,210,212,214 indicate periods of horizontal blanking. During these periods, the shutter (102 in FIG. 1) changes color, from one color to the next. FIG. 2a shows the scanning of two scan lines as six field-sequential color scans. For the purpose of clarification in the illustration, these figures illustrate the colored scan lines as being spatially separated, but this is not required. The phosphor will have decayed to black by the time the shutter is ready for the next color, so the colored scan lines need not be spatially separated in a working display. The spatial separation of the scan lines would occur to some extent if the display were scanned vertically in a simple linear fashion over time for a single frame.

FIG. 2a illustrates the following sequence, starting at the point in time when the shutter has just transitioned to red 204:

1. Draw the red component 216 of scan line 1;
2. The shutter changes color during horizontal blanking (HBLANK) to green 206;
3. The green component of line 1 is drawn 218;
4. The shutter changes color during HBLANK to blue 208;
5. The blue component of line 1 is drawn;
6. The shutter changes during HBLANK to red 210;
7. The red component of line 2 is drawn;
8. The shutter changes color during HBLANK to green 212;
9. The green component of line 2 is drawn;
10. The shutter changes color during HBLANK to blue 214.
11. The blue component of line 2 is drawn;
12. The shutter changes back to red;
13. The third and subsequent scan lines are drawn similarly.

This process is repeated until the frame has been drawn.

In an electro-luminescent (EL) display, the scanning sections would be groups or pixels (either contiguous or non contiguous regions) of the display, rather than lines.

Figure 2B:
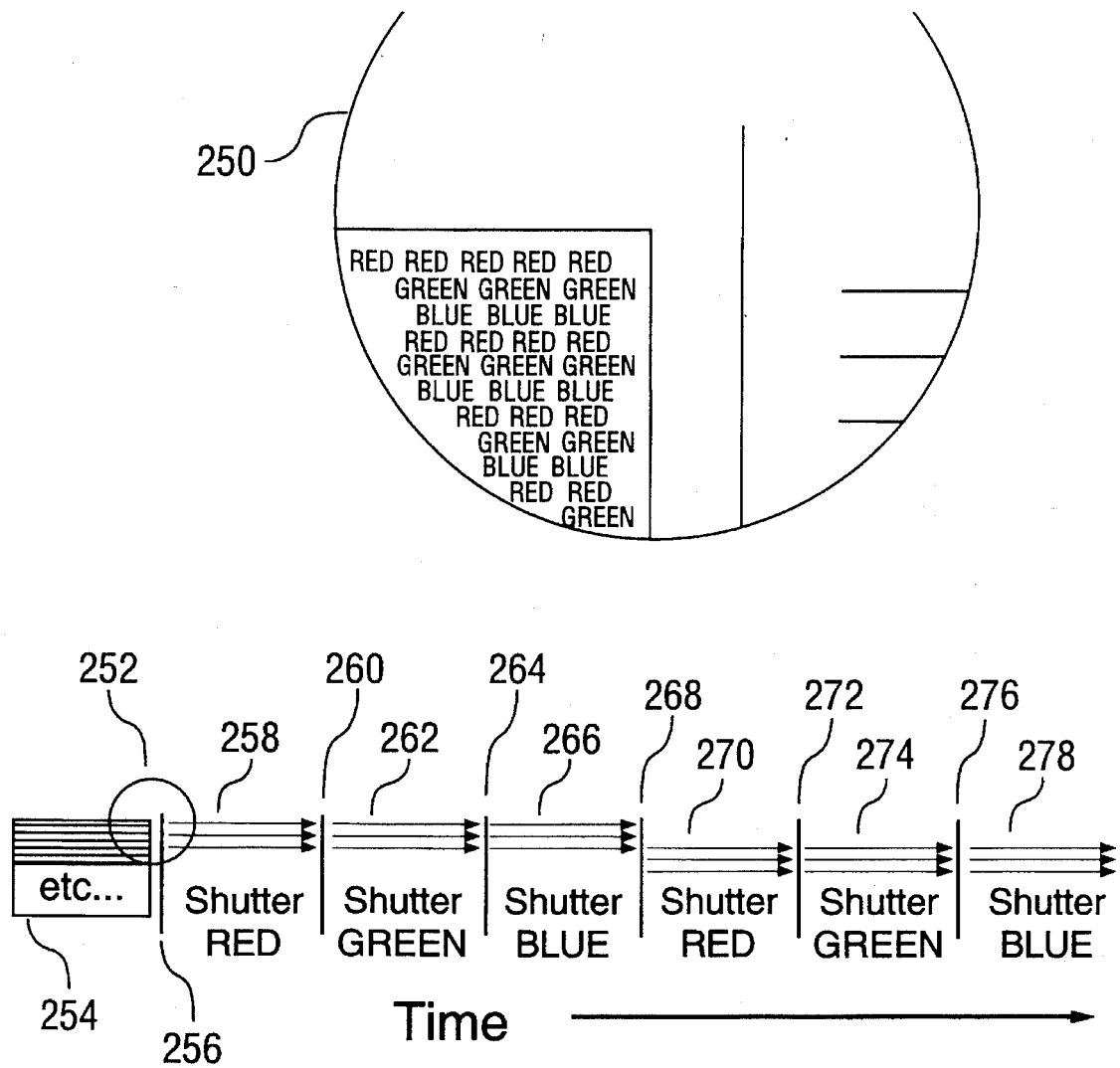
FIG. 2b illustrates the scanning of a color image by a line-field sequential color display in which n scan lines of one color are drawn and n scan lines of another color are drawn on top of the previous group.
Figure 3A:
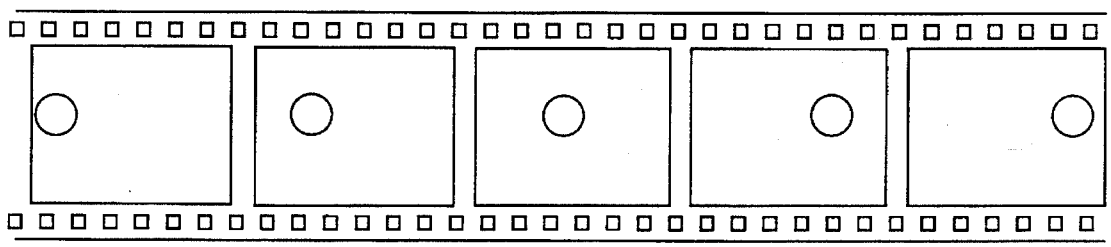
FIG. 3a illustrates the sequence of color images as perceived by the viewer of a traditional field-sequential display.
Figure 3B:
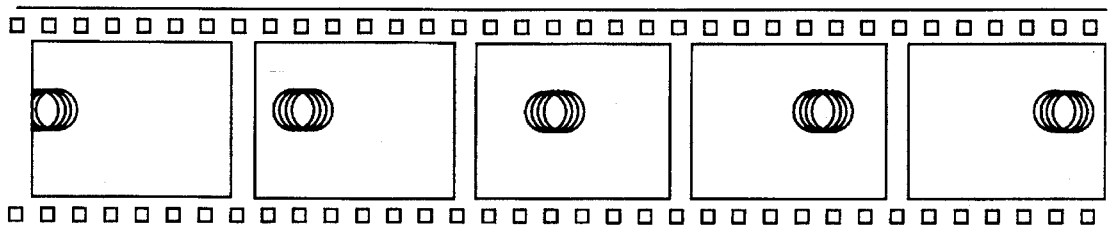
FIG. 3b illustrates the same picture as 3a, showing how the viewer would perceive it in a virtual reality application employing a head-mounted or head-coupled video display.

FIG. 2b shows another embodiment of the invention in which the scan lines are grouped into more than a single scan line 258,262,266,270,274,278. The perceived image is display surface 254. The circle 252 is enlarged in 250. This enlargement shows how the scan line pattern results in an interleaving of red, green, and blue lines. This embodiment does not require such a quick phosphor and shutter assembly as illustrated in FIG. 2a. The color shutter 100 is switching 260,264,268,272,276 when the display is blanked during the retrace between drawing color sections. In this case, the display's vertical scanning must backtrack up the display to draw the next color group on top of the previous one.

SUMMARY, RAMIFICATIONS & SCOPE OF THE INVENTION

The method of this invention provides several advantages over full-frame field-sequential color. It offers a better approach for wide field-of-view, immersive displays because the display does not break into color fields as the viewer moves or as objects depicted in the display move. It also is easier to interface existing equipment when the display is field sequential over a portion or single line of the display, as there is less data to store when one incorporates a converter from existing video formats to a field-sequential display. With this method, it is also possible to spatially anti-alias colors in the display which will improve the perceived image.

Our experience with two-color, full-frame field-sequential displays lead to the following discovery. A yellow (FIG. 3a) (red & green) object breaks into its two component colors (FIG. 3b) in an immersive, virtual reality application as the object (or the viewer) moves. Not only does the image split into a red/green pair, but it splits into several "ghost" images, each one red or green. We believe that the faster vertical scan rate (and resulting quick phosphor) exaggerates this effect, particularly in immersive displays. In non-immersive displays, the screen flicker does not result in the image leaving such ghosts.

Thus, color breakup is avoided if the system scans a smaller part of the screen at a higher rate, but leaves the overall rate at the original frequency. Based on our experience with immersive (wide field-of-view), full-frame, field-sequential displays, a display that does not have full-frame sub fields is desirable.

In a wide field-of-view display that allows head motion and/or moving objects, color-flicker fusion frequency is higher than one would expect. The line field-sequential display described in the method of this invention introduces only a fraction of the delay between colors that a full-frame field-sequential display will introduce. As a result, the colors do not break up into sub frames.

Using this method results in color video displays that integrate more smoothly with existing camera and computer video systems, because a converter box need only store a single line of video, rather than an entire frame. The buffering of a single line is much easier to achieve with very high-speed memory, whose cost would be prohibitive for a full-screen field sequential converter. The FIFO memories in the single line case are n (number of horizontal scan lines in the display) times smaller than in the full-screen approach.

A line field-sequential display with per-line color control using the simplest of vertical deflection schemes (employed by all standard monochrome CRTs) will have:

| | |
|---|---|
| RED GREEN BLUE | } Scan line 1 |
| RED GREEN BLUE | } Scan line 2 |
| RED GREEN etc. | } Scan line 3 |

In essence, the method of this invention provides a 3n line display where *n* is the number of lines in the original image. However, the ordering of the lines results in an image composed of colored lines, somewhat resembling a Sony Trinitron aperture-grille monitor on its side. The lines need not be so distinct as they could overlap one another. Even when the lines are distinct, one can eliminate the regularity of the color ordering to give each third of a pixel a distinct color. This increases the perceived vertical resolution. This could be accomplished by a pattern over time or with a random algorithm. The ordering of the drawing of the colors is only possible in a display in which one has control of the color of the sub-pixel primaries. (A pixel is composed of a triplet of colored sub pixels.)

|        | Frame Number |   |   |   |   |       |
|--------|---|---|---|---|---|-------|
|        | 1 | 2 | 3 | 4 | 5 | 6 ... |
| LINE 1 | R | G | B | G | R | B ... |
| LINE 1 | G | B | R | R | G | R ... |
| LINE 1 | B | R | G | B | B | R ... |
| LINE 2 | G | B | R | B | G | R ... |
| LINE 2 | B | R | G | G | B | G ... |
| LINE 2 | R | G | B | R | R | G ... |

Thus the scope of this invention is determined by the claims and their legal equivalents, rather than by the examples given.

We claim:

1. A method for scanning a line field-sequential color video display, comprising the steps of:

(a) combining a video display having a surface emitting white light, and a color shutter, in a way that filters white light from said display into primary colors provided by said color shutter, (b) drawing a sequence of different complete images over a time period, where each complete image in the sequence of complete images is drawn as a sequence of primary-colored lines or primary-colored groups of lines over time, such that radiation emitted from any particular physical place on the surface of the display averages out over the time period to white light having intensity within a gray scale range rather than light of a specific color, (c) while performing step (b), sequencing said color shutter on the basis of a desired primary color for each of said primary-colored lines or said primary-colored groups of lines so as to produce said each complete image as a full-color image over time, where the full-color image can be represented as M scan lines of full-color pixels, and each of the primary-colored groups of lines consists of radiation from P of the scan lines, where P is an integer equal to much less than M/2.

2. The method of claim 1, wherein P=1.

3. The method of claim 1, wherein P=3.

4. The method of claim 1, wherein said primary colors consist of a first color, a second color, and a third color, and wherein step (b) includes the steps of:

(d) drawing a line having the first color on an elongated region on the surface of the display;

(e) after step (d), drawing a line having the second color on said elongated region; and (f) after step (e), drawing a line having the third color on said elongated region.

5. The method of claim 4, wherein step (b) also includes the steps of:

(g) drawing a second line having the first color onto a second elongated region on the surface of the display;

(h) after step (g), drawing a second line having the second color onto said second elongated region; and (i) after step (h), drawing a second line having the third color onto said second elongated region.

6. The method of claim 1, wherein the video display emits white light of intensity within said gray scale range.

7. A method for generating a line field-sequential display of a color image, where the color image can be represented as M scan lines of pixels, the method including the steps of:

(a) receiving video data representing P of the M scan lines, where P is an integer much less than M/2, and where the video data includes first primary color components for each of said P of the scan lines, second primary color components for said each of said P of the scan lines, and third primary color components for said each of said P of the scan lines;

(b) storing the video data in a memory;

(c) writing the first primary color components for a first one of the scan lines from the memory to a line on a display;

(d) after step (c), writing the second primary color components for the first one of the scan lines from the memory to said line on the display; and (e) after step (d), writing the third primary color components for the first one of the scan lines from the memory to said line on the display;

(f) repeating step (c), (d), and (e), each time for a different one of said P of the scan lines, until the first primary color components, the second primary color components, and the third primary color components of all said P of the scan lines have been written on the display;

(g) repeating steps (a), (b), (c), (d), (e), and (f) to write on the display the first primary color components, the second primary color components, and the third primary color components of another subset of Q of said M scan lines, where Q is an integer much less than M/2, and Q can but need not equal P; and (h) repeating step (g), each time for a different subset of said M scan lines, until the first primary color components, the second primary color components, and the third primary color components of all of said M scan lines have been written on the display.

8. The method of claim 7, wherein P=1.

9. The method of claim 7, wherein P=3.

10. The method of claim 7, wherein the first primary color components, the second primary color components, and the third primary color components are red, green, and blue components.

11. A system for generating a line field-sequential color video display, including:

a display emitting white light comprising a sequence of lines of pixels;

color shutter means for filtering the white light from the display to exclude, at any instant, components of the white light other than a selected one of a set of primary color components, wherein the color shutter means includes control means for sequencing the selected one of the set of primary color components on a line-by-line basis to cause the color shutter means to output a sequence of filtered lines determining a color image, wherein each of the filtered lines is a primary color component of one of the lines of pixels, and each of three consecutive ones of the filtered lines is a different primary color component of one of the lines of pixels.

12. The method of claim 11, wherein the display is a gray-scale display which emits white light comprising a sequence of lines of gray-scale pixels.

* * * * *